June 10, 1958 J. V. FOSTER 2,838,360
SIMPLIFIED CRASH DATA RECORDER
Filed Feb. 16, 1955
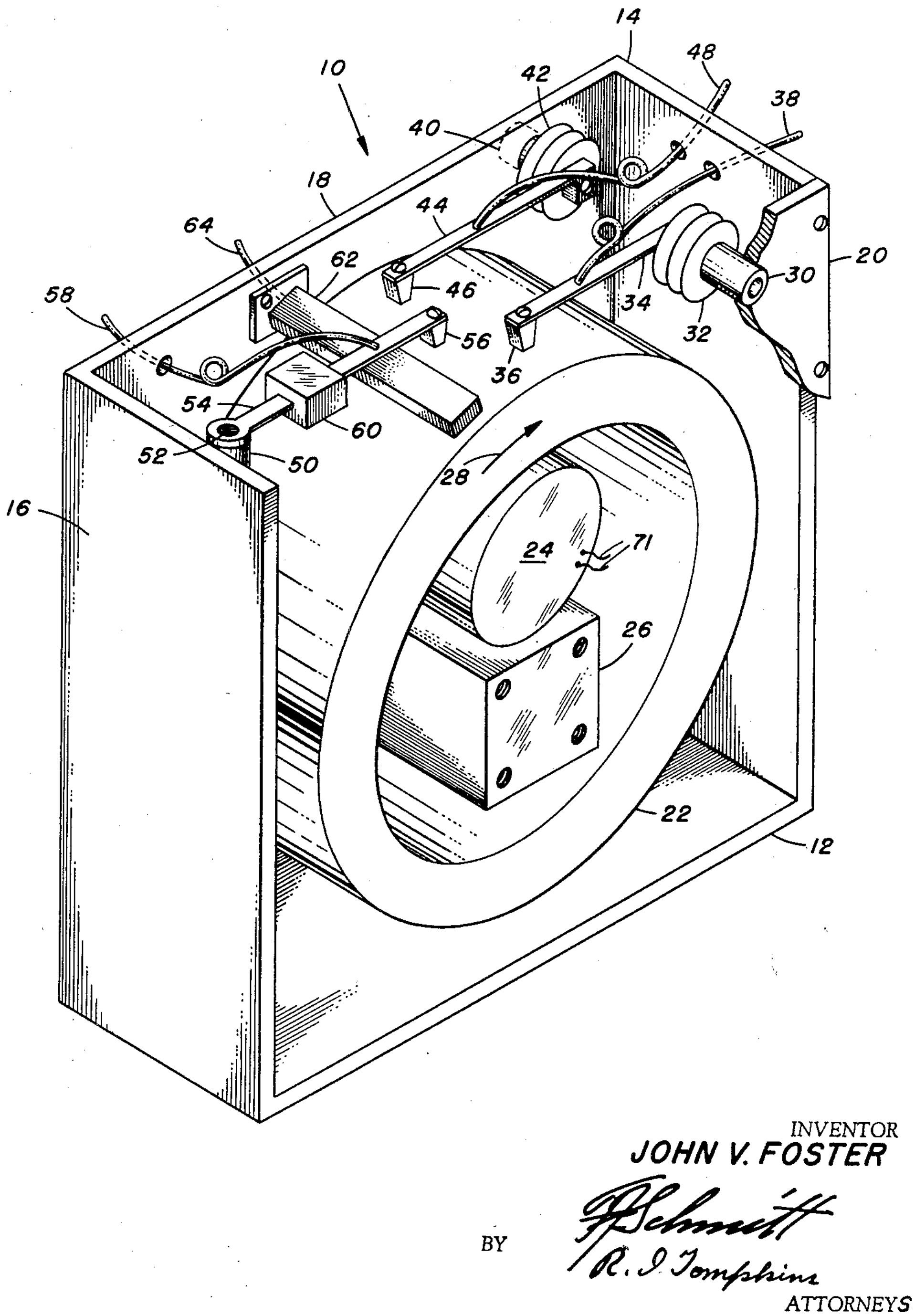
INVENTOR
JOHN V. FOSTER
BY F. Schmitt
R. I. Tompkins
ATTORNEYS United States Patent Office 2,838,360

Patented June 10, 1958

2,838,360

SIMPLIFIED CRASH DATA RECORDER

John V. Foster, Los Altos, Calif.

Application February 16, 1955, Serial No. 488,728

4 Claims. (Cl. 346—74)

(Granted under Title 35, U. S. Code (1952), sec. 266)

The invention described herein may be manufactured and used by or for the Government of the United States of America for governmental purposes without the payment of any royalties thereon or therefor.

The present invention relates to a data recorder and more particularly to an aircraft crash data recorder having means to record data relative to the last few minutes of flight before an aircraft crashes.

The prior art has resorted to more or less standard recording methods to record data pertaining to aircraft flight, such as photographic instruments, scratch records on waxed paper and magnetic tape recordings. Certain of the prior art methods have required that the recording medium, such as photographic film, be renewed from time to time, with attendant disadvantages of waste and danger of failure to renew the supply of recording medium. Other prior art devices, such as the magnetic tape recorder, can re-use the recording medium, but these devices are complex, prone to becoming inoperative and difficult to service.

The present invention contemplates a revolving drum upon which recording heads are caused to act to record data on the drum magnetically, together with an erase head immediately in front of the recording heads.

An object of the present invention is to provide an economical, simple and relatively fool proof crash data recorder.

Another object is to provide a crash data recorder which automatically records flight information for the last few minutes before the crash.

A still further object of the invention is the provision of a crash data recorder which is sufficiently sturdy to withstand an airplane crash and to preserve the recording medium.

A still further object of the present invention is to provide a method and means to record crash data on a magnetic surface in a manner which eliminates the need for elaborate read out devices and which permits magnetic recording on a magnetic surface moving at lower velocity than has heretofore been possible.

A final object of the present invention is the provision of a crash data recorder wherein the recording medium is resistant to destruction by fire and impact.

Other objects and many of the attendant advantages of this invention will be readily appreciated as the same becomes better understood by reference to the following detailed description when considered in connection with the accompanying drawings wherein:

The sole figure is a perspective view, with parts cut away, of a preferred embodiment of the invention.

There is shown a supporting cabinet 10 having a bottom 12, end walls 14 and 16 and a side wall 18. Side wall 20 is shown partially cut away. A top (not shown) is used in order to prevent the entrance of dust and other foreign bodies which might interfere with the operation of the mechanism.

A drum 22 having on the outer circumferential surface thereof a coating of magnetizable material is mounted for rotation, being supported by means (not shown) attached to side wall 18. The axis of drum 22 is parallel to the aircraft vertical axis. An electric motor 24 is supported on side wall 18, and furnishes power to a gear box 26. Leads 71 are provided to connect motor 24 to the aircraft's electrical system. Drum 22 is driven from gear box 26 in the direction shown by arrow 28.

In side wall 20 there is mounted a bushing 30 to which is attached a bellows 32. On the other end of bellows 32 is an arm 34 which carries a magnetic recording head 36. Current is furnished to head 36 by means of an electric wire 38 which may be conveniently passed through end wall 14 of cabinet 10. Similarly, a bushing 40 in side wall 18 has attached thereto a bellows 42. An arm 44 is mounted on the end of bellows 42, as shown, and carries a magnetic recording head 46. Current is furnished to head 46 by wire 48.

On end wall 16 there is mounted a bracket 50 carrying a spring loaded pivot pin 52 on which an arm 54 is mounted. Arm 54 has a magnetic recording head 56 on the end thereof, to which current is furnished by wire 58. A mass 60 is positioned on arm 54 intermediate its ends.

An erase head 62 is mounted on side wall 18, and current is supplied to it by wire 64.

As will be apparent by reference to the drawing, recording heads 36, 46, and 56 are of a width that is small in comparison with the width of one-third of the recording surface, while erase head 62 is sized to substantially span the entire width of the recording surface.

In operation, bushings 30 and 40 may be connected to any air pressure sensing means desired. Preferably, bellows 32 and head 36 constitute an altitude indicator and bellows 42 and head 46 an airspeed indicator. Variations of aircraft altitude and air speed will cause bellows 32 and 36, respectively, to expand or contract, as the case may be, to thereby cause recording heads 36 and 46 to move laterally of the recording surface. Upon the occurrence of an acceleration of the aircraft in which the invention is placed in a direction parallel to the axis of drum 22, arm 54 will be rotated towards one of the side walls 18 or 20, under the action of mass 60. Thereafter, the spring in bracket 50 will return the arm 54, and hence head 56, to its intermediate position. Upon deceleration, the opposite action will occur. The width of recording heads 36, 46, and 56 being small, as explained above, each of the recording heads 36, 46 and 56, will trace a magnetized line on the recording surface corresponding to variations in the parameters to which the recording heads respectively respond.

Drum 22 may conveniently be caused to make one revolution every five minutes. Alternating current supplied to each of the magnetic recording heads produces a reversing magnetic field about the recorder heads, and thus produces a north and a south pole on the drum surface at each current reversal. The erase head will erase the data recorded on the drum just prior to the time a given line on the drum reaches the recording heads. Hence, a "clean slate" is always presented to the recording heads, and substantially the full circumference of the drum will contain flight data for almost all of the previous five minutes. Recording heads 36, 46 and 56, and erase head 62 may, if desired, be permanent magnets, in which case the electric supply thereto, as shown, would be eliminated.

If the aircraft crashes, current will cease flowing, and all functions of the mechanism will stop. The drum 22 may be removed from the crashed aircraft and a liquid suspension of finely divided iron particles applied thereto. The iron particles will adhere to the parts of the surface of the drum which have been magnetized by the recording heads. Alternatively, finely powdered iron may be sprinkled on the drum and the excess dusted or blown off. This record may be made even more permanent by coating the surface with the iron particles thereon with a clear lacquer or the like.

Obviously many modifications and variations of the present invention are possible in the light of the above teachings. It is therefore to be understood that within the scope of the appended claims the invention may be practiced otherwise than as specifically described.

What is claimed is:

1. In an aircraft, an aircraft crash data recorder comprising a container, a drum having a magnetizable surface thereon, said drum being mounted for rotation about its axis in said container, an electric motor within said drum and connected therewith by gear means, whereby said drum may be rotated, at least first, second, and third recording heads, each having a width substantially less than one-third of the width of said surface positioned near said surface and spaced widthwise thereof, a plurality of actuating means in said container respectively connected to said first, second, and third recording heads, each of said actuating means being operative in response to a change in value of a parameter to move its associated recording head laterally of the path of motion of said magnetizable surface, whereby a magnetic record of the values of said parameters is impressed upon said surface, said magnetic record consisting of a plurality of lines, equal in number to said recording heads, of magnetized particles having spacial distributions corresponding to the values of said parameters, a magnetic erase head, sized to substantially span the width of said surface, positioned near said surface ahead of and in proximity to said recording heads, and means, adapted to be connected to an aircraft electrical system, to supply current to said motor, at least one of said actuating means comprising a lever having one end connected to one of said recording heads, a mass on said lever intermediate the ends thereof, a bracket mounted on said container, a pivot connected to the other end of said lever and rotatably supported in said bracket, means in said bracket yieldingly urging said pivot to one position, said lever being in a plane perpendicular to said drum axis when said pivot is in said one position.

2. In an aircraft, an aircraft crash data recorder comprising a container, a drum having a magnetizable surface thereon, said drum being mounted for rotation about its axis in said container, an electric motor within said drum and connected therewith by gear means, whereby said drum may be rotated, at least first, second, and third recording heads, each having a width substantially less than one-third of the width of said surface positioned near said surface and spaced widthwise thereof, a plurality of actuating means in said container respectively connected to said first, second, and third recording heads, each of said actuating means being operative in response to a change in value of a parameter to move its associated recording head laterally of the path of motion of said magnetizable surface, whereby a magnetic record of the values of said parameters is impressed upon said surface, said magnetic record consisting of a plurality of lines, equal in number to said recording heads, of magnetized particles having spacial distributions corresponding to the values of said parameters, a magnetic erase head, sized to substantially span the width of said surface, positioned near said surface ahead of and in proximity to said recording heads, and means, adapted to be connected to an aircraft electrical system, to supply current to said motor, at least one of said actuating means comprising a bellows having its axis generally parallel to said drum axis, and having at least one end moveable upon expansion or contraction of said bellows, said bellows being adapted to be connected to air pressure sensing means whereby it will expand or contract upon a change in air pressure, and means connecting at least one of said recording heads to said end of said bellows for movement therewith.

3. In an aircraft, an aircraft crash data recorder comprising a container, a drum having a magnetizeable surface thereon, said drum being mounted for rotation about its axis in said container, an electric motor within said drum and connected therewith by gear means, whereby said drum may be rotated, at least one magnetic recording head having a width substantially smaller than the width of said surface positioned near said surface, actuating means in said container responsive to a change in the value of a parameter to move said head laterally of the path of motion of said surface, whereby a magnetic record of the values of said parameter is impressed upon said surface, said magnetic record consisting of a line of magnetized particles having a spacial distribution corresponding to the values of said parameter, said actuating means comprising a bellows having its axis generally parallel to said drum axis, and having at least one end moveable upon expansion or contraction of said bellows, said bellows being adapted to be connected to air pressure sensing means whereby it will expand and contract upon a change in air pressure, means connecting said recording head to said end of said bellows for movement therewith, a magnetic erase head in said container positioned ahead of and in proximity to said recording means, and means, adapted to be connected to an electrical system, to supply current to said motor.

4. In an aircraft, an aircraft crash data recorder comprising a container, a drum having a magnetizeable surface thereon, said drum being mounted for rotation about its axis in said container, an electric motor within said drum and connected therewith by gear means, whereby said drum may be rotated, at least one magnetic recording head having a width substantially smaller than the width of said surface positioned near said surface, actuating means in said container responsive to a change in the value of a parameter to move said head laterally of the path of motion of said surface, whereby a magnetic record of the values of said parameter is impressed upon said surface, said magnetic record consisting of a line of magnetized particles having a spacial distribution corresponding to the values of said parameter, said actuating means comprising a lever having one end connected to said recording head, a mass on said lever intermediate the ends thereof, a bracket, a pivot connected to the other end of said lever and rotatably supported in said bracket means in said bracket yieldingly urging said pivot to one position, said lever being in a plane perpendicular to said drum axis when said pivot is in said one position, a magnetic erase head in said container positioned ahead of and in proximity to said recording means, and means adapted to be connected to an electrical system, to supply current to said motor.

References Cited in the file of this patent

UNITED STATES PATENTS

| | | |
|---|---|---|
| 1,534,306 | Bothezat et al. | Apr. 21, 1925 |
| 1,889,089 | De Giers | Nov. 29, 1932 |
| 2,414,976 | Redhed | Jan. 28, 1947 |
| 2,416,445 | Jensen | Feb. 25, 1947 |
| 2,540,654 | Cohen et al. | Feb. 6, 1951 |
| 2,583,983 | Arndt et al. | Jan. 29, 1952 |
| 2,632,815 | Crespinel | Mar. 25, 1953 |
| 2,633,404 | Hathaway | Mar. 31, 1953 |
| 2,657,932 | Blaney | Nov. 3, 1953 |
| 2,683,874 | Wainwright | July 13, 1954 |
| 2,695,211 | Guttwein et al. | Nov. 23, 1954 |
| 2,733,300 | Menard | Jan. 31, 1956 |

FOREIGN PATENTS

| | | |
|---|---|---|
| 283,815 | Germany | Apr. 24, 1915 |
| 373,006 | Germany | Apr. 6, 1923 |